June 12, 1934.　　　E. H. SMYTHE　　　1,962,367
MOTION PICTURE SYSTEM WITH SOUND
Filed July 25, 1931　　2 Sheets-Sheet 1
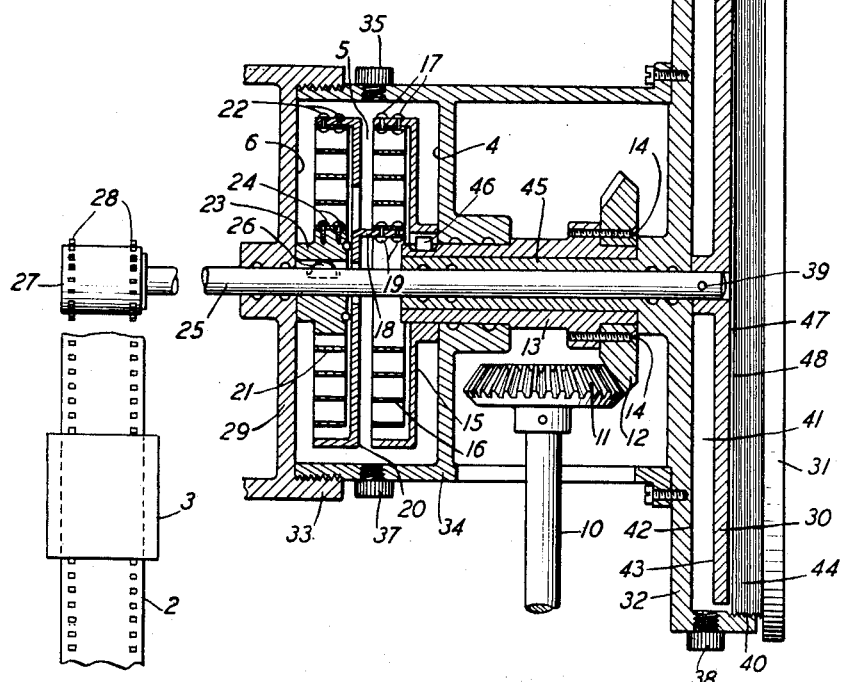
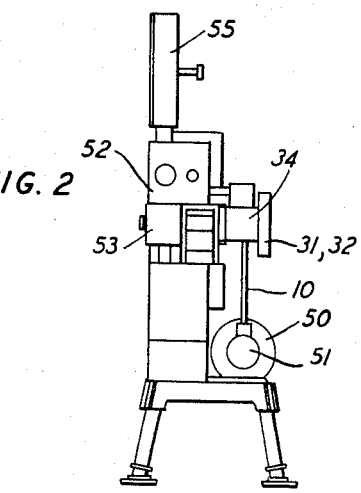
INVENTOR
E. H. SMYTHE
BY
G. H. Heydt.
ATTORNEY June 12, 1934.   E. H. SMYTHE   1,962,367
MOTION PICTURE SYSTEM WITH SOUND
Filed July 25, 1931   2 Sheets-Sheet 2
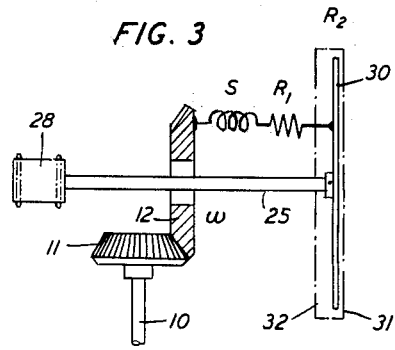
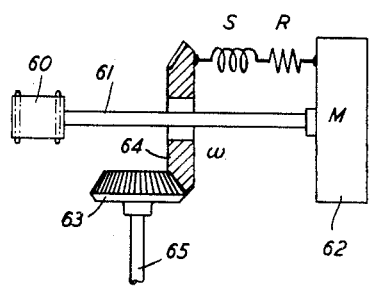
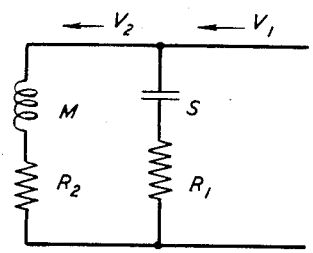
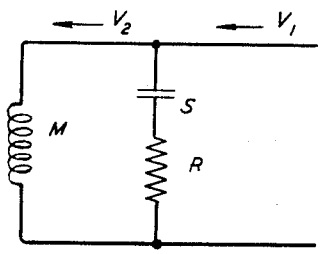
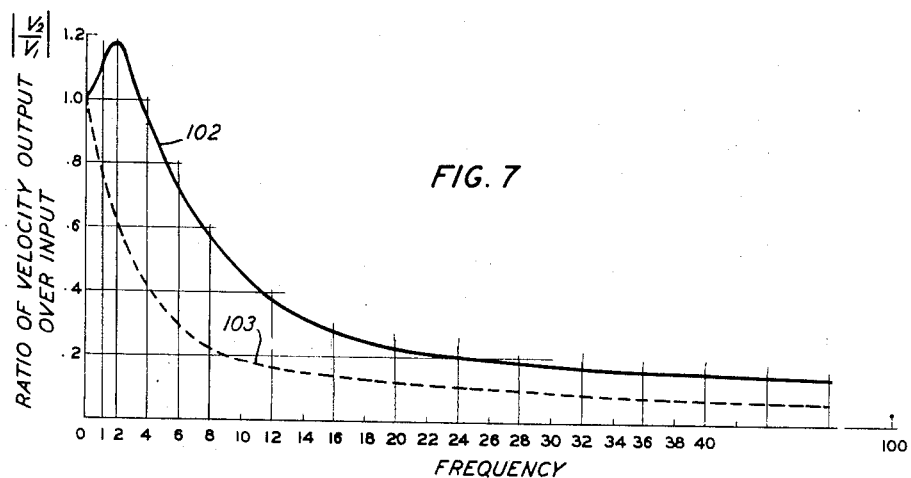
INVENTOR
E. H. SMYTHE
BY
G. H. Heydt
ATTORNEY Patented June 12, 1934

1,962,367

UNITED STATES PATENT OFFICE

1,962,367

MOTION PICTURE SYSTEM WITH SOUND

Edwin H. Smythe, Evanston, Ill., assignor to Bell Telephone Laboratories, Incorporated, New York, N. Y., a corporation of New York Application July 25, 1931, Serial No. 553,145

14 Claims. (Cl. 179—100.3)

This invention relates to sound picture apparatus and more particularly to a control mechanism for maintaining a film at constant velocity for sound translation.

The mechanism for recording and reproducing systems ordinarily involves driving an intermittent motion and a sound film sprocket from a common driving source. The intermittent motion intermittently positions the film before lenses for photographic exposure or projection to a screen. At the same time a sprocket must move the film at unvarying velocity before sound translating apparatus. Variations in the velocity of the sound film cause distortions of sound. Some distortions are not audible. Others are audible and must therefore be eliminated.

In mechanisms of this general character which use the aforementioned common driving source a variety of irregularities exist. The majority of these irregularities are produced by infinitesimal imperfections in the parts of the driving mechanism. These imperfections, however, need not necessarily be great to affect sound translation. Irregularities may be grouped into high and low frequencies according to the effect produced. The high frequency irregularities are caused by gear teeth and consequent harmonics produced thereby. The low frequency irregularities are caused by cyclic modulations in speed due to imperfections in the driving motor, imperfect layout of gear teeth, eccentricities, etc. In certain instances the low frequency irregularities cause disturbances because they modulate the higher frequency tones being reproduced.

It is apparent that if irregularities of movement are introduced during recording, the sound record will not be uniform and unless the same identical irregularities are introduced when this film record is reproduced, the effect will be noticeable. On the other hand, if a sound record is perfectly recorded and irregularities of film motion are introduced during reproduction, distorted sounds are produced.

One method which has been used to minimize the effect of irregularities in the driving mechanism is to mount a heavy fly-wheel on the sound sprocket shaft. The function of this fly-wheel is to absorb or give out mechanical energy in response to fluctuations in applied torque, thereby minimizing the fluctuations. The fly-wheel is not as effective in suppressing low frequency irregularities as it is in suppressing the higher freqency irregularities. The limiting factor determining the size and mass of the fly-wheel is therefore the low frequency group of disturbances. A fly-wheel must therefore be of large mass to reduce the effect of these low frequency disturbances. This adds materially to the weight of a sound picture camera or reproducing apparatus. In order that the fly-wheel be made effective for absorbing and giving out energy it must be coupled directly to the sound sprocket. Because of the momentum of the fly-wheel this brings about certain difficulties in starting and stopping recording and reproducing apparatus when a sudden change is made necessary. To avoid these difficulties, it is therefore desirable to have small inertia in a sound picture recording or reproducing mechanism.

The object of this invention is, therefore, to provide in a sound picture apparatus, a resistance terminated filter of inconsiderable mass for securing uniform velocity of a film driving sprocket comprising an elastic member and a resistance terminal so constituted as to produce equilibrium at said sprocket with respect to velocity changes.

One embodiment of this invention resides in controlling velocity changes in a device driven by an electric motor run, for example, at 20 revolutions per second. The motor drives the mechanism of sound picture apparatus, which includes the intermittent motion and a sprocket for regulating the movement of the film. The aforementioned sprocket regulates the movement of the film past the sound modulator and the rotation thereof must be maintained uniform at all times to prevent distortion of sounds. For convenience, this sprocket will be hereinafter known as the sound sprocket. A member of a particular elasticity is placed between the driving motor and the shaft on which the sound sprocket is mounted. The elasticity for this device is disclosed in the form of band springs. A number of driving links comprising shafts and gears are of necessity introduced between the motor and the driven end of the elastic or spring member. All of the mechanisms of the sound picture apparatus, including the intermittent motion, are driven through the agency of these shafts and gears. Any of these devices, including the motor, gears, shafts or the driven mechanisms, may by slight imperfections cause velocity changes. The effect of these velocity changes is present in the elastic member in the form of angular velocity changes but must not cause angular velocity changes in the sound sprocket.

In the consideration of this problem the constant or uniform velocity of the sound sprocket must be taken as a zero factor. The uniform velocity may be defined as that which would be obtained if no irregularities existed to introduce velocity changes. Thus, in the devices of this invention, velocity changes only are of interest. These velocity changes are of various frequencies depending upon the cyclic velocity of the member producing the change.

In addition to the foregoing velocity changes introduced by irregularities, variations in film resistance must be taken into consideration. A normal resistance or load is usually exerted on the film at the point of translation by a pressure pad, curved plate, roller or the like to maintain the film in alignment. A film which is not uniform produces some variation in resistance load. This load variation will produce a velocity change at the sound sprocket unless counteracting force is introduced.

A member for resisting angular changes in velocity is therefore fixed on the sound sprocket shaft at the alternate end from the sound sprocket. This member is of as small mass as possible, and the resistance produced thereby is comparable with pure ohmic resistance. Interacting forces are thus produced to establish equilibrium at the sound sprocket. This resistance member is such as, in cooperation with its associated elements, to make velocity variations due to irregularities in driving devices and film variations less than would cause a sound distortion detectable by the ear.

Fig. 1 is a view in cross-section of one embodiment of the resistance terminated filter according to the invention;

Fig. 2 illustrates the assembly of the resistance terminated filter in a projecting machine;

Figs. 3 and 5 illustrate the characteristics of the resistance terminated filter;

Figs. 4 and 6 illustrate the characteristics of a mass terminated filter; and

Fig. 7 illustrates the frequency characteristics for differently arranged filters.

As previously set forth an electric motor 50 as shown in Fig. 2 is used as a common power source for driving all of the mechanism of a sound picture machine. This includes the intermittent motion of conventional design in projector head 52 and the sound sprocket such as 27 shown in Fig. 1 and mounted in sound unit 53 of Fig. 2. Shaft 10, shown in Figs. 1 and 2 is driven by motor 50 through gears mounted in gear box 51. Gear 11 connected to this shaft drives gear 12 for propelling the sound sprocket 27 through the agency of an elastic member comprising springs 16 and 21 and the associated housings. The gear 12 is fastened by screws 14 to a sleeve 13. This sleeve is arranged to rotate upon an axial housing 45 which is shown as a part of the housing 32. Sleeve 13 is rigidly connected to spring housing 15 by key 46.

Two springs 16 and 21 are shown connected together by member 18 to form the elasticity between the driving mechanism and the sound sprocket. The spring 16 is fastened to the rotatable member 15 by rivets 17. The other end of spring 16 is fastened to a second rotatable member 20 by rivets 19. It will be noted that a portion of the rotatable member 20 is pressed from the housing to form the L shaped member 18. One end of the second spring 21 is fastened to the rotatable member 20 by rivets 22. The inner end of spring 21 is fastened by screws 24 to a hub member 23. This hub member is rigidly fastened to the sound sprocket shaft 25 by key 26. The sound sprocket 27 is rigidly fastened to the shaft 25 by a key, not shown.

Shaft 25 and sound sprocket 27 are thus driven through the agency of an elastic member. This member responds to velocity changes introduced by the motor, gear teeth or other mechanisms, in the mechanical driving linkage.

The resistance member is shown at the alternate end of shaft 25 from the sound sprocket. This resistance member comprises a rotatable member 30 of as small mass as possible rigidly fastened to shaft 25 by a pin or key 39. A sealed housing is provided for the rotatable member which is formed partly by housing 32 and partly by an adjustable cap 31. The space between the inner walls of housing 32 and cap 31 is partly filled with a medium of the proper viscosity, preferably oil. Filler plug 36 and drain plug 38 are provided to accommodate the filling and draining of the housing. Cap 31 may be adjusted to create the resistance desired between surface 47 of rotatable member 30, viscous oil and surface 48 of the cap 31. To accommodate this adjustment, screw threads 40 and 44 are provided on the inner flange of housing 32 and on the periphery of cap 31, respectively. The space 41 is purposely made large in order that the resistance between the surface 42 of housing 32, the viscous oil and surface 43 of member 30 is comparatively small. The resistance between the surfaces 42 and 43 is a constant factor and may be calculated according to the viscosity of the oil in the encasement. The rotatable member 30, although shown as a flat disc, may have such contour as is best adapted to give it maximum rigidity with minimum mass, the cooperating casing surface being shaped to conform.

The housings 29 and 34 provide an encasement for the elastic member. This encasement may be filled with an oil of very slight viscosity. Filler plugs 35 and 37 are provided for filling and draining the encasement. The distance between the outer surface of housing 15 and the surface of wall 4 and also the distance between spring 21 and the surface of wall 6 are purposely made large to minimize resistance. The oil dampening is provided for the elastic member only to dampen radial movements or oscillations of the clock springs. This resistance, introduced in this member because of this oil, is negligible as compared with the resistance provided by rotatable member 30.

A film 2 is shown associated with sprocket 27 and is drawn past the light modulator through the agency of sound sprocket teeth 28. A film pad and gate of conventional design are shown schematically at 3. A friction load is ordinarily exerted on the film at the point of sound translation. This may be exerted by a film pad as shown or by other well known arrangements. Ample allowance is made in the power of the driving mechanism for this load, which may be otherwise termed film resistance, and also for added load produced by film variations. In view of the necessity of splicing films it is difficult to prevent a variation in the film load at this point. The warping of the film and slight accumulation of dirt on the film due to film abrasion are other factors to be considered. This variation in film load does not produce a great change in the velocity of the film. The change is, however, sufficient to produce sound distortion. In order to overcome this velocity change in the film a swamping load is placed on the sound sprocket 27 by rotating member 30. This load is preferably several hundred times greater than the greatest film load variation at the point of sound translation.

The elasticity or stiffness of the elastic member or spring is such as to cooperate with the driving mechanism and the driven mechanism between which it is interposed. This elasticity is arranged to substantially absorb all cyclic velocity variations, including those of the lowest disturbing frequencies that flow from the driving mechanism and in effect short-circuit the velocity variations and prevent them from reaching the sound sprocket. The large load that is placed on sprocket 27 by the terminal resistance member 30 and its associated elements to swamp the velocity variations due to varying film load, also acts to damp out the low frequency velocity variations flowing from the driving mechanism, and cause them to be taken up and short-circuited in the spring, thus preventing them from reaching the sound sprocket. The force produced at the resistance terminal (resistance) (velocity) and the force produced by drive irregularities may be termed interacting forces to produce equilibrium at the sound sprocket. To produce this result the load of the terminating resistance member must be such as to cause the elastic member to yield to velocity changes in the driving mechanism without causing any substantial angular velocity change in the sound sprocket. Conversely the elasticity or stiffness must be so constituted that when resisted by a particular load of the terminating resistance member it will absorb velocity changes originating in the driving mechanism.

The adjustable cap 31 is provided in order to accurately regulate the resistance to give the filter the required resistance characteristic. Any variation in the viscosity of the oil or other element used may be compensated for by an adjustment of this cap. The correct ratio between the terminal resistance and the elastic member to absorb drive variations and the correct resistance to absorb film velocity variations is thus obtained.

In Figs. 3 to 6 inclusive a comparison has been made between the resistance terminated filter and the mass terminated filter. These drawings have been made in the schematic form of mechanical transmission line diagrams. In Figs. 3 and 5 a diagram of the resistance terminated filter is shown in which 30 is the rotatable member of the terminal resistance, $R_2$ represents the large or swamping resistance between the rotatable member 30 and the encasement 31—32, S represents the elasticity or stiffness of the elastic member, $R_1$ represents the small resistance between the elastic member and the encasement 29—34 due to the light oil in this encasement, and M represents the small mass necessarily present in the sound sprocket 28, shaft 25 and rotating resistance member 30. In Figs. 4 and 6, M is the mass of the fly-wheel 62 which in this case is the controlling factor for minimizing velocity changes at the sound sprocket, S represents an elasticity or stiffness and R represents resistance which is coupled with the elastic member. The resistance at the elastic member in this case must be great to prevent fly-wheel oscillations generally known as hunting. $V_1$ shown on these diagrams represents velocity input which should be interpreted as change in velocity introduced by irregularities rather than constant velocity. $V_2$ represents velocity output which should also be interpreted as change in velocity.

In Fig. 7 curves are shown which indicate the comparative performance of mass and resistance terminated filters in the transmission to the sound sprocket of cyclic variations of different frequencies impressed by irregularities in the drive. These curves represent the result of calculations and measurements, and show the ratio of velocity output or velocity variations at the sound sprocket to velocity input or velocity variations in the driving mechanism for the range of frequencies noted.

As in the case of Figs. 5 and 6, the symbol $V_1$ represents velocity input and the symbol $V_2$ represents velocity output.

In both types of filter at zero frequency, that is, when the velocity of the drive is preferably uniform with no impressed cyclic variations, the ratio of the input or drive velocity to the output or sprocket velocity is unity. As drive velocity variations commence to be impressed the fly-wheel resonance of the mass terminated filter causes the ratio of output to input velocity to rise to a peak at a frequency corresponding to the undamped resonance frequency of the system, as shown in curve 102, after which the ratio steadily decreases as the impressed frequency rate increases. But in the resistance terminated filter, as shown in curve 103, the ratio of output or sprocket velocity variation to input or drive velocity variation does not develop a peak, and decreases rapidly as the impressed cyclic variations increase in frequency.

The velocity variations which are most difficult to eliminate in sound picture mechanisms of the type under consideration are near the frequency of 6 per second. It will be noted that according to curve 103 the ratio of these variations which get through to the sound sprocket at this frequency is very much reduced, and is much less than the corresponding ratio in curve 102 of the fly-wheel terminated filter. Thus reduced, the velocity changes are of such small magnitude as to produce no audible distortions in the translated sound. If velocity changes do not produce a tone or distortion which is audible to the ear they are considered to have been eliminated satisfactorily for all purposes of sound translation.

The operation speed of a motor for driving a sound picture mechanism may be assumed as 20 revolutions per second or higher. At the present time it has been impossible to make a motor without some slight irregularities. In consequence of this, there are slight oscillations transmitted to the driving mechanism by the motor. These oscillations or irregularities occur at the frequency of 20 per second. These irregularities of the higher frequency are more easily eliminated both in the mass terminated filter and the resistance terminated filter. It is, however, apparent from the curve 103 that the velocity changes at the frequency of 20 have practically no effect upon the sound sprocket when the filter according to the invention is used.

The resistance terminated filter in addition to its advantage in filtering out low and high frequency disturbances is also subject to less disturbance from unforeseen and uncontrollable factors which inherently cause velocity changes. Such disturbances are produced by backlash of gears between the motor and the filter, flexibility of couplings and shafts between the motor and the filter, and unforeseen eccentricities.

What is claimed is:

1. In a sound picture apparatus in which a sound record is formed on a strip or band of negligible mass, a sound translating device, a cylinder arranged to move said strip past a point of sound translation, a drive for said cylinder including mechanism which produces deflections from irregularities causing velocity variations, an elastic member between said driving mechanism and said cylinder, and a terminating resistance member comprising a rotating element rigidly connected to said cylinder and a fixed element arranged to interact against said deflecting forces to produce equilibrium at said cylinder.

2. In a sound picture apparatus in which a sound record is formed on a film, a sound translating device, a cylinder arranged to move said film past a point of sound translation, a resistance device acting to place a load on said film at said translating device and means to rotate said cylinder at unvarying speed comprising a drive, an elastic member between said drive and said cylinder and a resistance means of very small mass directly associated with said cylinder, the load of said resistance means being large in value as compared with the value of resistance load placed on said film at the translating device said mass being insufficient to exert control by kinetic energy.

3. In a sound picture apparatus in which a sound record is formed on a film, a sound translating device, a cylinder arranged to move said film past a point of sound translation, a drive of variable velocity and means to rotate said cylinder at unvarying velocity comprising a resistance terminated filter including an elastic member interposed between said drive and said cylinder and a swamping resistance terminal of relatively small mass for said cylinder arranged to produce a large resistance load and negligible kinetic energy.

4. In a sound picture apparatus in which a sound record is formed on a film, a sound translating device, a cylinder arranged to move said film past a point of sound translation, a drive of variable velocity and means to rotate said cylinder at unvarying velocity comprising a resistance terminated filter including an elastic member interposed between said drive and said cylinder and a swamping resistance terminal formed by an encasement with a viscous element therein and a rotatable device, the surface of the rotatable device being positioned close to an inner surface of said encasement to establish a frictional resistance between said surfaces and the viscous element.

5. In a sound picture apparatus in which a sound record is formed on a strip or band of negligible mass, a sound translating device, means for moving said strip past a point of sound translation, a viscous load, a driving source for driving said means and said load, mechanism interconnecting the driving source with said means and load, irregularities in said mechanism producing variations in the driving force which result in velocity changes, an elastic member between said mechanism and said means and load, and means to establish such ratio between said load, elasticity and variations that equilibrium is established at the means for moving said strip.

6. In a sound picture apparatus in which a sound record is formed on a strip or band of negligible mass, a sound translating device, means for moving said strip past a point of sound translation, a viscous load, a driving source for driving said means and said load, mechanism interconnecting the driving source with said means and load, irregularities in said mechanism producing variations in the driving force which result in velocity changes, and an elastic member between said mechanism and said means and load, the constants of said load and said elasticity being so chosen with respect to said driving force irregularities that equilibrium is established at the means for moving said strip.

7. In a sound picture apparatus in which a sound record is formed on a strip or band of film, a sound translating device, a cylinder arranged to move said film past a point of sound translation, a resistance device acting to place a load on said film at said translating device, which load may vary as a result of film irregularities, and means to rotate said cylinder and move said film past the point of sound translation at an unvaried speed, said means comprising a drive subject to velocity variations, an elastic member between said drive and said cylinder, and a resistance means of insufficient mass to exert control by kinetic energy directly associated with said cylinder, the elasticity of said elastic member and the resistance of said resistance means being so chosen as to counteract the effect of, and suppress velocity variations produced by said varying load and drive, and establish equilibrium at said cylinder.

8. In a sound picture apparatus in which a sound record is formed on a strip or band of negligible mass, a sound translating device, a cylinder arranged to move said strip past a point of sound translation, a resistance terminated filter for suppressing velocity variations of said cylinder and adjustable means to vary the resistance in said filter for adjusting the velocity variation suppressing characteristic of said filter.

9. In a sound picture apparatus in which a sound record is formed on a film, a sound translating device, a cylinder arranged to move said film past a point of sound translation, means for rotating said cylinder at unvarying speed comprising a drive, an elastic member between said drive and said cylinder and an adjustable resistance terminal having a member connected to and rotatable with said cylinder the mass of said member being insufficient to suppress velocity variations by kinetic energy.

10. In a sound picture apparatus in which a sound record is formed on a strip or band of negligible mass, a sound translating device, a cylinder arranged to move said strip past a point of sound translation, a resistance terminated filter for controlling the velocity of said cylinder comprising an elastic member and a resistance member, and means to adjust said resistance member to vary the resistance characteristic of said filter.

11. In a sound picture apparatus in which a sound record is formed on a strip or band of negligible mass, a sound translating device, a cylinder arranged to move said strip past a point of sound translation, a resistance terminated filter for controlling the velocity of said cylinder comprising an elastic member and a resistance member, and means to adjust said resistance member to obtain a particular ratio between the resistance and the elasticity of respective members.

12. In a sound picture apparatus in which a sound record is formed on a strip or band of negligible mass, a sound translating device, a cylinder arranged to move said strip past a point of sound translation, a drive for said cylinder including mechanism which produces deflections from irregularities causing velocity variations, a variable film load, a resistance terminated filter for suppressing velocity variations of said cylinder comprising an elastic member and a resistance member and means to adjust said resistance member to obtain a particular resistance according to the stiffness characteristic of the elastic member and deflections caused by irregularities in driving mechanism and film load.

13. In a sound picture apparatus in which a sound record is formed on a film, a sound translating device, a cylinder arranged to move said film past a point of sound translation, a drive of variable velocity and means to rotate said cylinder at unvarying velocity comprising a resistance terminated filter including an elastic member interposed between said drive and said cylinder and a swamping resistance terminal formed by an encasement with oil therein and a rotatable device rigidly connected to said cylinder, said rotatable device having a surface positioned close to an inner surface of said encasement and means to adjust the space relation between said surfaces to alter the resistance between said surfaces and the oil as required.

14. The method of operating sound translating apparatus in which sound is translated by the use of light varied in accordance with the sound, consisting in driving a film at a constant velocity through the agency of an elastic member associated with the film driving means operated under the control of a velocity variation suppressing terminal resistance member of insufficient mass to exert control by kinetic energy, the resistance of said terminal being of a value large as compared with the resistance due to the movement of the film through said apparatus.

EDWIN H. SMYTHE.